(12) United States Patent
Kausch et al.

(10) Patent No.: US 7,608,710 B2
(45) Date of Patent: Oct. 27, 2009

(54) CATIONIC SURFACTANTS

(75) Inventors: Charles M. Kausch, Copley, OH (US);
Yongsin Kim, Hudson, OH (US);
Richard R. Thomas, Stow, OH (US);
David L. Hardman, Jr., Akron, OH (US)

(73) Assignee: OMNOVA Solutions Inc., Fairlawn, OH (US)

( * ) Notice: Subject to any disclaimer, the term of this patent is extended or adjusted under 35 U.S.C. 154(b) by 700 days.

(21) Appl. No.: 11/448,619

(22) Filed: Jun. 7, 2006

(65) Prior Publication Data

US 2006/0293521 A1     Dec. 28, 2006

Related U.S. Application Data

(60) Provisional application No. 60/688,552, filed on Jun. 7, 2005.

(51) Int. Cl.
*C07D 453/02*     (2006.01)
*C07D 487/04*     (2006.01)
(52) U.S. Cl. .................. 544/351; 528/25; 528/402; 546/137; 549/510
(58) Field of Classification Search .............. None
See application file for complete search history.

(56) References Cited

U.S. PATENT DOCUMENTS 4,421,872 A * 12/1983 Buethe et al. ............... 521/174

| 5,107,033 | A | * | 4/1992 | Pechhold | 568/615 |
|---|---|---|---|---|---|
| 5,215,918 | A | * | 6/1993 | Muchmore | 435/280 |
| 5,731,399 | A | * | 3/1998 | Carter et al. | 528/79 |
| 5,807,977 | A | | 9/1998 | Malik et al. | 528/402 |
| 6,403,760 | B1 | | 6/2002 | Weinert et al. | 528/402 |
| 6,479,623 | B1 | * | 11/2002 | Malik et al. | 528/402 |
| 6,660,828 | B2 | | 12/2003 | Thomas et al. | 528/402 |
| 6,673,889 | B1 | | 1/2004 | Weinert et al. | 528/70 |
| 6,686,051 | B1 | | 2/2004 | Weinert et al. | 428/458 |
| 6,855,775 | B2 | | 2/2005 | Medsker et al. | 525/327.3 |
| 7,022,801 | B2 | | 4/2006 | Medsker | 528/27 |
| 7,087,710 | B2 | | 8/2006 | Medsker et al. | 528/402 |
| 2003/0109662 | A1 | * | 6/2003 | Medsker et al. | 528/25 |
| 2004/0171775 | A1 | | 9/2004 | Yamamoto | 526/247 |
| 2005/0228120 | A1 | * | 10/2005 | Hughes et al. | 524/588 |
| 2008/0312382 | A1 | * | 12/2008 | Kausch et al. | 525/403 |

FOREIGN PATENT DOCUMENTS

GB     2 050 396     1/1981

* cited by examiner

*Primary Examiner*—James Seidleck
*Assistant Examiner*—John J Figueroa
(74) *Attorney, Agent, or Firm*—Arthur M. Reginelli

(57) ABSTRACT

A surfactant comprising a polyether segment including at least one pendant alkoxyfluoroalkyl group, and a cationic substituent defined by one of the formulae:

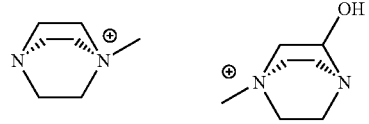

or the substituted derivatives thereof.

14 Claims, No Drawings

CATIONIC SURFACTANTS

This application gains the benefit of U.S. Provisional Application No. 60/688,552, filed Jun. 7, 2005, which is incorporated herein by reference.

FIELD OF THE INVENTION

This invention relates to cationic surfactants that include polyether substituents including pendant alkoxy fluoroalkyl groups.

BACKGROUND OF THE INVENTION

Cationic surfactants are known and have a variety of uses. For example, cationic surfactants can be used in the synthesis of emulsion polymers. They can also be used to form coatings on surfaces that are negatively charged such as glass.

Polyethers including one or more pendant alkoxyfluoroalkyl groups, which typically derive from the polymerization of cyclic ethers (e.g., oxetanes) including pendant alkoxyfluoroalkyl groups, have been employed in aqueous and nonpolar liquid compositions to provide one or more of wetting, flow, and leveling properties. Surfactants including a polyether segment of this type are known. In particular, polyethers bearing one or more pendant alkoxyfluoroalkyl groups and a positively charged (i.e., cationic) substituent have been disclosed. The ability to synthesize these compounds, however, is not trivial, and low yields are typically obtained.

Inasmuch as polyethers bearing pendant alkoxyfluoroalkyl groups and a cationic substituent are highly desirable, there remains a need to develop specific compounds of this type and efficient synthetic routes for synthesizing the same.

SUMMARY OF THE INVENTION

A surfactant comprising a polyether segment including at least one pendant alkoxyfluoroalkyl group, and a cationic substituent defined by one of the formulae:

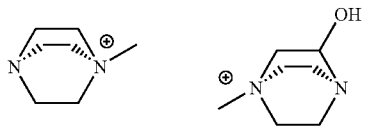

or the substituted derivatives thereof.

A method of preparing a cationic surfactant, the method comprising (i) providing an initiator compound including at least one hydroxyl group and at least an halogen atom, (ii) initiating the polymerization of cyclic ether monomers with the initiator compound, where the monomers include one or more monomer having a pendant alkoxyfluoroalkyl group to provide a polyether precursor compound, (iii) reacting an amine compound defined by one of the formulae

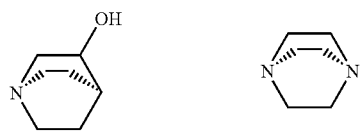

as well as the substituted derivatives thereof. Examples of tertiary amine compounds according to one of these formulae include 1,4-diazabicyclo[2.2.2.]octane, 3-quinucidinol, and mixtures thereof.

DETAILED DESCRIPTION OF ILLUSTRATIVE EMBODIMENTS

The compounds and surfactants of one or more embodiments of the present invention include polymers and oligomers. These compounds and surfactants include a polyether segment that includes at least one pendant alkoxyfluoroalkyl group and a cationic functionality or substituent. In one or more embodiments, the cationic functionality includes a quaternary amine. In one or more embodiments, the positive charge of the cationic group can be neutralized with a counter anion thereby forming a quaternary ammonium salt. In one or more embodiments, the quaternary amine includes the residue of (i.e., derives from) 1,4-diazabicyclo[2.2.2.]octane or 3-quinucidinol.

In one or more embodiments, the polyether segment includes one or more repeat units defined by the formula

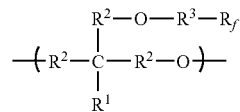

where $R^1$ is a monovalent organic group or a substituent defined by the formula $—R^2—O—R^3—R_f$, $R^2$ is a divalent organic group, $R^3$ is a divalent organic group or a bond, and $R_f$ is a monovalent organic group with at least 25% of the hydrogen atoms being replaced by fluorine. In one or more embodiment, at least 50%, in other embodiments at least 75%, in other embodiments at least 90%, and in other embodiments at least 99% of the hydrogen atoms of the $R_f$ group are replaced by fluorine (or in other embodiments fluorine and a complementary halogen atom). In one or more embodiments, $R_f$ is perfluorinated.

In one or more embodiments, the divalent organic group may include a hydrocarbylene group or substituted hydrocarbylene group such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups, with each group preferably containing from 1 carbon atom, or the appropriate minimum number of carbon atoms to form the group, up to about 20 carbon atoms. Substituted hydrocarbylene group includes a hydrocarbylene group in which one or more hydrogen atoms have been replaced by a substituent such as an alkyl group. The divalent organic groups may also contain one or more heteroatoms such as, but not limited to, nitrogen, oxygen, boron, silicon, sulfur, and phosphorus atoms.

In one or more embodiments, the monovalent organic groups may include hydrocarbyl groups or substituted hydrocarbyl groups such as, but not limited to alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to 20 carbon atoms. These hydrocarbyl groups may contain heteroatoms such as, but not limited to, nitrogen, boron, oxygen, silicon, sulfur, and phosphorus atoms.

In one or more embodiments, the polyether segment or tail includes one or more repeat units defined by one or more of the formulae

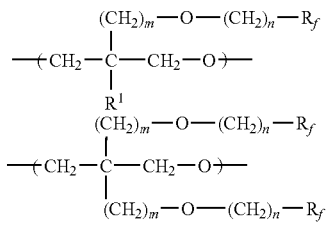

where m is an integer from 1 to about 3, n is an integer from about 0 to 3, $R^1$ is a hydrogen atom or monovalent organic group, and $R_f$ is a linear or branched alkyl group including 1 to about 20 carbon atoms with at least 25% of the hydrogen atoms being replaced by fluorine. In one or more embodiments, $R^1$ is selected from hydrogen, methyl, or ethyl. In other embodiments, $R^1$ is selected from hydrogen and methyl. In one or more embodiments, the remaining hydrogen atoms within said $R_f$ group may optionally be replaced by other halogen atoms such as iodine, chlorine, or bromine. In one or more embodiments, the $R_f$ group includes from 1 to 7 carbon atoms. In one or more embodiments, at least 50%, in other embodiments at least 75%, in other embodiments at least 90%, and in other embodiments at least 99% of the hydrogen atoms of the $R_f$ group are replaced by fluorine (or in other embodiments fluorine and a complementary halogen atom). In one or more embodiments, $R_f$ is perfluorinated.

In one or more embodiments, the polyether segment can include repeat or mer units deriving from tetrahydrofuran. In other words, the polyether may include a repeat unit described above and one or more repeat units deriving from tetrahydrofuran (THF). The source of THF can be from the BF3·THF used as a polymerization catalyst or it can be added deliberately. The level of incorporated THF can be from 1 to about 50 mole percent (optionally about 5 to about 30 mole percent).

In one or more embodiments, the polyether tail can include from about 1 to about 20 repeat or mer units, in other embodiments from about 3 to about 7 repeat or mer units, and in other embodiments from about 2 to about 5 repeat or mer units. In one or more embodiments, at least 75% of the repeat or mer units include the pendant alkoxyfluoroalkyl groups, in other embodiments at least 50% of the repeat or mer units include the pendant alkoxyfluoroalkyl groups, and in other embodiments at least 10% by weight of the repeat or mer units include the pendant alkoxyfluoroalkyl groups.

In one or more embodiments, the quaternary amine head group may include those substituents defined by the formulae

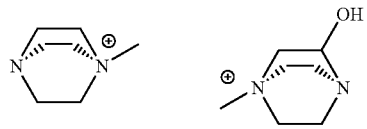

as well as the substituted derivatives thereof. The substituted derivatives include those substituents where a hydrogen atom is replaced by a hydroxyl group or a monovalent organic group.

Exemplary counter anions include halide ions including fluoride, chloride, bromide, and iodide ions, as well as acetate ions such as those defined by the formula $RcO_2^-$, where R is a monovalent organic group.

In one or more embodiments, the surfactants of this invention may be prepared by polymerizing cyclic ethers that include pendant alkoxyfluoroalkyl groups in the presence of a halogenated alcohol initiator to form a halogenated polyether precursor, and then reacting the precursor with an amine.

Methods for polymerizing cyclic ethers including pendent alkoxyfluoroalkyl groups are known as described in U.S. Pat. Nos. 6,423,418, 6,383,651, 6,579,966, 6,465,565, 6,565,566, which are incorporated herein by reference.

In one or more embodiment, the cyclic ether that is polymerized or oligomerized includes cyclic oxetane. One or more of the cyclic oxetane may include one or more pendant alkoxyfluoroalkyl groups. In one or more embodiments, the cyclic oxetane monomer may be defined by at least one of the formulae

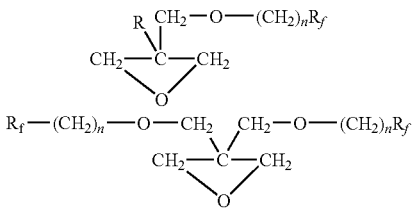

wherein each n is, independently, 0 to about 6 wherein R is hydrogen or monovalent organic group, and wherein each $R_f$ is, independently, a monovalent organic group with a minimum of 50% of the hydrogen atoms of said $R_f$ group being replaced by F, and optionally up to all of the remaining H atoms being replaced by I, Cl, or B. In certain embodiments, n is an integer from 1 to 3, R is hydrogen or an alkyl group having from 1 to 6 carbon atoms, and $R_f$ is an alkyl group including 1 to 20 carbon atoms. In these or other embodiments, $R_f$ includes from 1 to 6, and in other embodiments from 2 to 5 carbon atoms. In these or other embodiments, at least 90% of the hydrogen atoms of $R_f$ are replaced by fluorine. In certain embodiments, $R_f$ is perfluorinated. In certain embodiments, these monomer are copolymerized with comonomer including THF.

The resultant precursor includes one or more halogen atoms at the head of a polyether chain. This precursor can then be reacted with a tertiary amine defined by one of the formulae

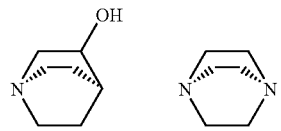

as well as the substituted derivatives thereof. Examples of tertiary amine compounds according to one of these formulae include 1,4-diazabicyclo[2.2.2.]octane, 3-quinucidinol, and mixtures thereof.

Useful halogenated-alcohols can be defined by the formula

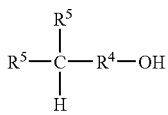

where $R^4$ is a bond or divalent organic group, each $R^5$ is independently a monovalent organic group or halogen atom, and X is a halogen atom. Examples of useful halogenated alcohols include 3-chloro-1-propanol, 3-iodo-1-propanol, 3-bromo-1-propanol, and mixtures thereof.

The reaction between the tertiary amine and halogen containing polyether precursor (i.e., the quaternization reaction) can take place in various solvents including isopropanol, diethylene glycol monobutyl ether (Butyl Carbitol), and mixtures thereof. The reaction conditions generally include elevated temperatures, which may serve to provide advantageous thermodynamic and kinetic results. For example, in one or more embodiments, the reaction mixture can be refluxed at about 90° C. for about 48 hours in isopropanol, or in other embodiments, the reaction mixture can be refluxed at about 105° C. for 12 hours in diethyleneglycolmonobutylether.

In one or more embodiments, the compounds or surfactants of this invention are useful as fluorosurfactants. In one or more embodiments, these fluorosurfactants are useful as at least one of a wetting, flow, and leveling agent in aqueous systems. While the amount of polyether compound of this invention that is used in various aqueous compositions may vary, it may be useful to employ from about 50 ppm to about 10 wt %, optionally from about 100 ppm to about 5 wt %, and optionally from about 500 ppm to about 1 wt % of the surfactant of this invention based upon the total weight of aqueous solution. These fluorosurfactants may also be used to emulsify various polymers. Still further, these fluorosurfactants can be employed to form coatings that can demonstrate technologically useful absorbsion to substrates, particularly those bearing a negative charge (e.g., glass).

The polyether compounds can have a beneficial impact on several types of aqueous compositions. These aqueous compositions include, but are not limited to, floor polish, aqueous paints, spin-on coatings (e.g., semiconductor cleaning solutions, dielectric compositions, and photo resist compositions), cleaning formulations, leather coatings, and wood coatings.

The polyether compounds of the present invention can also be used as wetting, leveling and flow agents in solvent-borne (i.e., non-polar) coating systems.

In order to demonstrate the practice of the present invention, the following examples have been prepared and tested. The examples should not, however, be viewed as limiting the scope of the invention. The claims will serve to define the invention.

EXAMPLES

Synthesis of 3-iodo-1-propanol

A 500 mL, 3-necked round-bottomed flask equipped with a condenser and temperature probe was charged with 100.0 g (1.06 moles) of 3-chloro-1-propanol. A solution of sodium iodide (1.58 g, 1.06 moles) in 200 mL of acetone were added. An immediate white precipitate was observed. The solution was heated to reflux temperature for 72 hours. The solution was allowed to cool to room temperature, and 53.8 g of sodium chloride precipitate was removed by vacuum filtration. The product was purified by distillation. The main fraction was collected at 112-116° C. at 29.5 in Hg to yield 124 g (63%) of 3-iodo-1-propanol and was identified by $^1$H and $^{13}$C NMR spectroscopy.

Synthesis of 3-iodo-1-propanol-terminated polymer

A 250 mL, 3-necked round-bottomed flask equipped with a magnetic stirrer, condenser, temperature probe and pressure-equalizing addition funnel was charged with 3-iodo-1-propanol (26.7 g, 0.14 moles), BF3·THF (20.1 g, 0.14 moles), and 53 g of benzoltrifluoride. The reaction was allowed to stir for 30 minutes. A fluorinated oxetane monomer (i.e., 3-methyl-3-[(6,6,6,5,5,4,4,3,3-nonafluorohexanoxy)methyl]oxetane) was added dropwise over 51 minutes. An exotherm was observed, increasing the reaction temperature from 27.8° C. to 43.7° C. After 90 additional minutes, the reaction was quenched by addition of the reaction mixture to 325 mL 7.5 weight percent sodium bicarbonate solution (0.29 moles) and the organic layer was separated, the solvent removed. The polymer was vacuum distilled to a head temperature of 128° C. at 29 in Hg. The reaction yielded 107.6 g of polymer with a degree of polymerization of 2.78. The products analyzed satisfactorily by $^1$H and $^{13}$C NMR spectroscopy. The degree of polymerization was established by titration of the terminal hydroxyl group with trifluoroacetic anhydride and integration of trifluoroactetate groups versus pendant methylene groups on the polymer backbone by $^1$H NMR spectroscopy.

Synthesis of Cationic Fluorosurfactant

A 250 mL, 3-necked round-bottomed flask was equipped with a magnetic stirrer, condenser and temperature probe. To the flask were added 50 g of 3-iodo-1-propanol-terminated polymer (0.0433 moles), 4.86 g of 1,4-diazabicyclo[2.2.2]octane and 50 g of isopropanol. The reaction was heated to reflux for 48 hours. After 48 hours, 28 weight percent residual 1,4-diazabicyclo[2.2.2.]octane was detected. An additional 16 g of 3-iodo-1-propanol-terminated polymer was added to covert residual 1,4-diazabicyclo[2.2.2]octane, ultimately yielding 67.23 g of cationic fluorosurfactant. The identity of the cationic fluorosurfactant was confirmed by mass spectroscopically (MALDI) by the presence of the correct molecular ion (formula weight—I⁻) for a degree of polymerization=1 (519 amu), 2 (867 amu), 3 (1215 amu) and 4 (1563 AMU). The $^1$H and $^{13}$C NMR were complicated but indicated the formation of the expected species. Elemental composition by combustion analysis gave C, 40.1; F, 32.8; N, 1.5 versus a theoretical composition of C, 37.5; F, 37.5; N, 2.21.

Various modifications and alterations that do not depart from the scope and spirit of this invention will become apparent to those skilled in the art. This invention is not to be duly limited to the illustrative embodiments set forth herein.

What is claimed is:
1. A surfactant comprising:
   a polyether segment including at least one pendant alkoxyfluoroalkyl group; and
   a cationic substituent defined by one of the formulae:

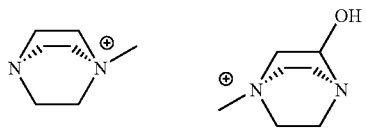

or the substituted derivatives thereof.

2. The surfactant of claim 1, wherein the surfactant includes a salt including a counter anion.

3. The surfactant of claim 1, where said polyether segment includes at least one repeat unit defined by the formula

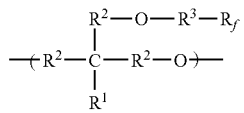

where $R^1$ is a monovalent organic group or a substituent defined by the formula —$R^2$—O—$R^3$—$R_f$, $R^2$ is a divalent organic group, $R^3$ is a divalent organic group or a bond, and $R_f$ is a monovalent organic group with at least 25% of the hydrogen atoms being replaced by fluorine.

4. The surfactant of claim 3, where said polyether segment is defined by one or more of the formulae

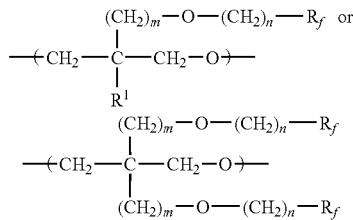

where m is an integer from 1 to about 3, n is an integer from about 0 to 3, $R^1$ is a hydrogen atom or monovalent organic group, and $R_f$ is a linear or branched alkyl group including 1 to about 20 carbon atoms with at least 25% of the hydrogen atoms being replaced by fluorine.

5. The surfactant of claim 1, where said polyether segment includes from about 1 to about 20 repeat or mer units.

6. The surfactant of claim 5, where at least 75% of the repeat or mer units of said polyether segment include the pendant alkoxyfluoroalkyl groups.

7. The surfactant of claim 6, where said polyether segment includes repeat or mer units deriving from tetrahydrofuran.

8. The surfactant of claim 6, where $R_f$ is perfluorinated.

9. A method of preparing a cationic surfactant, the method comprising:
(i) providing an initiator compound including at least one hydroxyl group and at least one halogen atom;
(ii) initiating the polymerization of cyclic ether monomers with the initiator compound, where the monomers include one or more monomer having a pendant alkoxyfluoroalkyl group to provide a polyether precursor compound;
(iii) reacting the precursor compound and an amine compound defined by one of the formulae

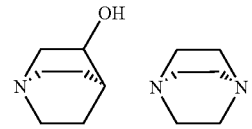

as well as the substituted derivatives thereof.

10. The method of claim 9, where said initiator includes halogenated alcohols defined by the formula

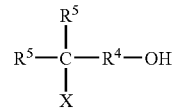

where $R^4$ is a bond or divalent organic group, $R^5$ is a monovalent organic group or halogen atom, and X is a halogen atom.

11. The method of claim 10, wherein said halogenated alcohol is selected from the group consisting of 3-chloro-1-propanol, 3-iodo-1-propanol, 3-bromo-1-propanol, and mixtures thereof.

12. The method of claim 9, where said amine includes 1,4-diazabicyclo[2.2.2.]octane, 3-quinucidinol, and mixtures thereof.

13. The method of claim 9, where said step of reacting an amine compound with the precursor compound takes place in a solvent selected from the group consisting of isopropanol, diethyleneglycolmonobutylether, and mixture thereof.

14. The method of claim 13, where said step of reacting an amine compound with the precursor compound takes place at elevated temperatures.

* * * * *

UNITED STATES PATENT AND TRADEMARK OFFICE
CERTIFICATE OF CORRECTION

PATENT NO. : 7,608,710 B2　　　　　　　　　　　　　　　　　　　　　　Page 1 of 1
APPLICATION NO. : 11/448619
DATED : October 27, 2009
INVENTOR(S) : Kausch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 812 days.

Signed and Sealed this

Twelfth Day of October, 2010

David J. Kappos
*Director of the United States Patent and Trademark Office*